US012809280B2

(12) United States Patent
Sekiya et al.

(10) Patent No.: US 12,809,280 B2
(45) Date of Patent: Nov. 24, 2026

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Michiyo Sekiya, Shizuoka (JP); Akihiro Maruyama, Shizuoka (JP); Masashi Nishi, Kanagawa (JP); Nanami Kato, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 465 days.

(21) Appl. No.: 18/609,415

(22) Filed: Mar. 19, 2024

(65) Prior Publication Data

US 2024/0345495 A1 Oct. 17, 2024

(30) Foreign Application Priority Data

Apr. 13, 2023 (JP) ................................ 2023-065931

(51) Int. Cl.

*G03G 5/047* (2006.01)
*G03G 5/05* (2006.01)
*G03G 5/07* (2006.01)
*G03G 21/18* (2006.01)

(52) U.S. Cl.

CPC ........... *G03G 5/047* (2013.01); *G03G 5/0525* (2013.01); *G03G 5/076* (2013.01); *G03G 21/1814* (2013.01)

(58) Field of Classification Search

CPC .......... G03G 5/07; G03G 5/076; G03G 5/074; G03G 5/0679

See application file for complete search history.

(56) References Cited

U.S. PATENT DOCUMENTS

| | | | | |
|---|---|---|---|---|
| 6,287,738 | B1 * | 9/2001 | Duff | G03G 5/0661 430/59.1 |
| 7,378,205 | B2 | 5/2008 | Sekiya | |
| 8,343,699 | B2 | 1/2013 | Nagasaka | |
| 8,465,889 | B2 | 6/2013 | Sekido | |
| 8,524,430 | B2 | 9/2013 | Takagi | |
| 8,632,935 | B2 | 1/2014 | Sugiyama | |
| 8,765,335 | B2 | 7/2014 | Tanaka | |

(Continued)

FOREIGN PATENT DOCUMENTS

| | | |
|---|---|---|
| JP | 2003-345044 A | 12/2003 |
| JP | 2010-198014 A | 9/2010 |
| WO | 2007/024522 A1 | 3/2007 |

OTHER PUBLICATIONS

Shinzo Yamashita and Tosuke Kaneko, "Crosslinking Agent Handbook", published by Taiseisha Ltd. (1981).

(Continued)

*Primary Examiner* — Peter L Vajda

(74) *Attorney, Agent, or Firm* — VENABLE LLP

(57) ABSTRACT

Provided is an electrophotographic photosensitive member including in this order: a support; an electron-transporting layer; a charge-generating layer; and a hole-transporting layer, wherein the electron-transporting layer comprises a polymer having a specific structural unit, and wherein the polymer has a glass transition temperature Tg of −10 to 50 °C.

9 Claims, 4 Drawing Sheets

(56) References Cited

U.S. PATENT DOCUMENTS

| | | | |
|---|---|---|---|
| 8,795,936 | B2 | 8/2014 | Sekido |
| 9,029,054 | B2 | 5/2015 | Okuda |
| 9,034,545 | B2 | 5/2015 | Maruyama |
| 9,063,505 | B2 | 6/2015 | Sekiya |
| 9,069,267 | B2 | 6/2015 | Kaku |
| 9,170,506 | B2 | 10/2015 | Tanaka |
| 9,170,507 | B2 | 10/2015 | Sugiyama |
| 9,235,144 | B2 | 1/2016 | Yamamoto |
| 9,274,442 | B2 | 3/2016 | Sato |
| 9,436,106 | B2 | 9/2016 | Kuno |
| 9,436,107 | B2 | 9/2016 | Murakami |
| 9,442,401 | B2 | 9/2016 | Sekido |
| 9,459,545 | B2 | 10/2016 | Tanaka |
| 9,477,163 | B2 | 10/2016 | Nishi |
| 9,523,929 | B2 | 12/2016 | Nakamura |
| 9,535,346 | B2 | 1/2017 | Sekiya |
| 9,541,850 | B2 | 1/2017 | Nishida |
| 9,563,139 | B2 | 2/2017 | Kawahara |
| 9,599,917 | B2 | 3/2017 | Okuda |
| 9,645,515 | B2 | 5/2017 | Kuno |
| 9,645,516 | B2 | 5/2017 | Kawahara |
| 9,726,992 | B2 | 8/2017 | Sakuma |
| 9,760,030 | B2 | 9/2017 | Sekiya |
| 9,772,568 | B2 | 9/2017 | Sekido |
| 9,772,596 | B2 | 9/2017 | Mitsui |
| 9,811,011 | B2 | 11/2017 | Nishi |
| 9,851,648 | B2 | 12/2017 | Nishi |
| 9,864,285 | B2 | 1/2018 | Nishi |
| 9,869,032 | B2 | 1/2018 | Kawahara |
| 9,921,498 | B2 | 3/2018 | Sekido |
| 10,372,050 | B2 | 8/2019 | Nishi |
| 10,416,581 | B2 | 9/2019 | Ito |
| 10,539,892 | B2 | 1/2020 | Nishida |
| 10,558,132 | B2 | 2/2020 | Ishiduka |
| 10,558,133 | B2 | 2/2020 | Nakamura |
| 10,642,177 | B2 | 5/2020 | Nakamura |
| 10,691,033 | B2 | 6/2020 | Nishida |
| 10,747,130 | B2 | 8/2020 | Okuda |
| 10,747,131 | B2 | 8/2020 | Watanabe |
| 10,831,118 | B2 | 11/2020 | Watanabe |
| 10,838,315 | B2 | 11/2020 | Shimozawa |
| 11,003,102 | B2 | 5/2021 | Ishiduka |
| 11,126,097 | B2 | 9/2021 | Ishida |
| 11,181,837 | B2 | 11/2021 | Sekiya |
| 11,237,493 | B2 | 2/2022 | Makisumi |
| 11,249,407 | B2 | 2/2022 | Watariguchi |
| 11,256,186 | B2 | 2/2022 | Shimozawa |
| 11,366,402 | B2 | 6/2022 | Ishiduka |
| 11,392,050 | B2 | 7/2022 | Nishida |
| 11,392,074 | B2 | 7/2022 | Ishida |
| 11,726,414 | B2 | 8/2023 | Sekido |
| 11,782,353 | B2 | 10/2023 | Nakamura |
| 11,947,275 | B2 | 4/2024 | Iwasaki |
| 11,960,240 | B2 | 4/2024 | Nishi |
| 2011/0268472 | A1 | 11/2011 | Sekido et al. |
| 2014/0004456 | A1 | 1/2014 | Okuda et al. |
| 2021/0325794 | A1 | 10/2021 | Iwasaki |
| 2023/0055856 | A1 | 2/2023 | Sekiya |
| 2023/0058278 | A1 | 2/2023 | Maruyama |
| 2023/0059041 | A1 | 2/2023 | Kaku |
| 2023/0059773 | A1 | 2/2023 | Yamaai |
| 2023/0090596 | A1 | 3/2023 | Sekido |
| 2023/0093328 | A1 | 3/2023 | Nishi |
| 2023/0288826 | A1 | 9/2023 | Nakazono |
| 2023/0288867 | A1 | 9/2023 | Shimozawa |
| 2023/0333494 | A1 | 10/2023 | Watariguchi |
| 2023/0350314 | A1 | 11/2023 | Sekido |
| 2024/0004322 | A1 | 1/2024 | Makisumi |
| 2024/0118634 | A1 | 4/2024 | Watanabe |
| 2024/0118635 | A1 | 4/2024 | Ishida |
| 2024/0118655 | A1 | 4/2024 | Sekido |
| 2024/0168398 | A1 | 5/2024 | Yamaai |
| 2024/0192616 | A1 | 6/2024 | Hiyama |
| 2024/0201608 | A1 | 6/2024 | Sakakibara |
| 2024/0201609 | A1 | 6/2024 | Ishiduka |

OTHER PUBLICATIONS

U.S. Appl. No. 18/602,786, filed Mar. 12, 2024, Masashi Nishi.
U.S. Appl. No. 18/609,744, filed Mar. 19, 2024, Akihiro Maruyama.
U.S. Appl. No. 18/616,656, filed Mar. 26, 2024, Akihiro Maruyama.
U.S. Appl. No. 18/620,077, filed Mar. 28, 2024, Masashi Nishi.
U.S. Appl. No. 18/678,255, filed May 30, 2024, Nobuhiro Nakamura.

* cited by examiner

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present invention relates to an electrophotographic photosensitive member, and a process cartridge and an electrophotographic apparatus each including the electrophotographic photosensitive member.

Description of the Related Art

In an electrophotographic photosensitive member to be used for an electrophotographic process, there is known a technology involving arranging an undercoat layer containing an electron-transporting substance between a support and a photosensitive layer for the purpose of suppressing charge injection from the support side to the photosensitive layer side to suppress the occurrence of an image failure such as a black spot.

In Japanese Patent Application Laid-Open No. 2010-198014, there is a description of an electron-transporting layer containing a copolymer having a repeating unit including a structure having electron transportability. In addition, in Japanese Patent Application Laid-Open No. 2003-345044, there is a description of a resin having a repeating unit including a structure having electron transportability.

In recent years, the electrophotographic process has been required to achieve mass printing and high-speed printing. Through an investigation made by the inventors of the present invention, it has been found that in an electrophotographic photosensitive member described in each of Japanese Patent Application Laid-Open No. 2010-198014 and Japanese Patent Application Laid-Open No. 2003-345044, when the mass printing and the high-speed printing are performed, an image failure called a pattern memory and an image failure called a ghost may occur.

The pattern memory is such a phenomenon as described below. For example, an image 301 including vertical lines 306 illustrated in FIG. 1A is continuously output in a large number, and then a solid black image 302 illustrated in FIG. 1B is output. At this time, in the phenomenon, the output solid black image causes an image 304 including such vertical lines 307 as illustrated in FIG. 1C, the lines resulting from the fact that the vertical lines 306 in the image 301 illustrated in FIG. 1A have been repeatedly recorded. In addition, for example, the image 301 illustrated in FIG. 1A is continuously output in a large number, and then a halftone image 303 illustrated in FIG. 1D is output. In this case, in the phenomenon, as in the case where the solid black image 302 illustrated in FIG. 1B is output, an image 305 including vertical lines 308 illustrated in FIG. 1E, the lines resulting from the fact that the vertical lines 306 in the image 301 illustrated in FIG. 1A have been repeatedly recorded, occurs.

In addition, the ghost is such a phenomenon as described below. For example, such an image as illustrated in FIG. 2A including black backgrounds (black images) 52 in a white background (white image) 51 in its front portion, followed by a halftone image 53 of a one-dot keima (knight of Japanese chess) pattern illustrated in FIG. 2B, is output. At this time, in the phenomenon, such portions as indicated by ghost portions 54, the portions each having an image density different from that of its surroundings, occur in the halftone image 53 of the image illustrated in FIG. 2A.

SUMMARY OF THE INVENTION

Accordingly, an object of the present invention is to provide an electrophotographic photosensitive member that can suppress the occurrence of a pattern memory and a ghost, a method of producing the electrophotographic photosensitive member, a process cartridge including the electrophotographic photosensitive member, and an electrophotographic apparatus including the electrophotographic photosensitive member.

The above-mentioned object is achieved by the present invention described below. That is, according to the present invention, there is provided an electrophotographic photosensitive member including in this order: a support; an electron-transporting layer; a charge-generating layer; and a hole-transporting layer, wherein the electron-transporting layer comprises a polymer having a structural unit represented by the following formula (1), the following formula (2), or the following formula (3), and wherein the polymer has a glass transition temperature Tg of −10 to 50 °C:

(1)

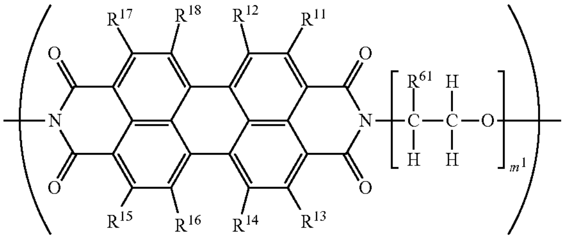

(2)

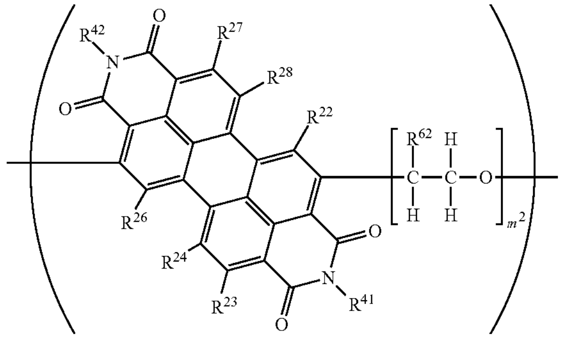

(3)

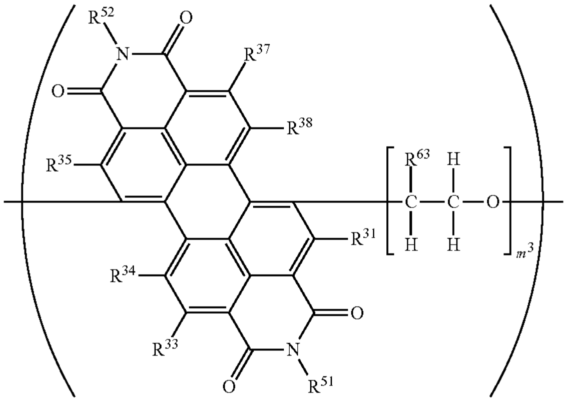

in the formula (1), $R^{11}$, $R^{12}$, $R^{13}$, $R^{14}$, $R^{15}$, $R^{16}$, $R^{17}$, and $R^{18}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{61}$ represents a hydrogen atom, or a substituted or unsubstituted alkyl group, and $m^1$ represents an integer of 2 to 16;

in the formula (2), $R^{22}$, $R^{23}$, $R^{24}$, $R^{26}$, $R^{27}$, and $R^{28}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{62}$ represents a hydrogen atom, or a substituted or unsubstituted alkyl group, $R^{41}$ and $R^{42}$ each independently represent a hydrogen atom, a substituted or unsubstituted alkyl group, or a substituted or unsubstituted aryl group, and $m^2$ represents an integer of 2 to 16; and in the formula (3), $R^{31}$, $R^{33}$, $R^{34}$, $R^{35}$, $R^{37}$, and $R^{38}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{63}$ represents a hydrogen atom, or a substituted or unsubstituted alkyl group, $R^{51}$ and $R^{52}$ each independently represent a hydrogen atom, a substituted or unsubstituted alkyl group, or a substituted or unsubstituted aryl group, and $m^3$ represents an integer of 2 to 16.

Further features of the present invention will become apparent from the following description of exemplary embodiments with reference to the attached drawings.

DESCRIPTION OF THE EMBODIMENTS

Figure 1A:
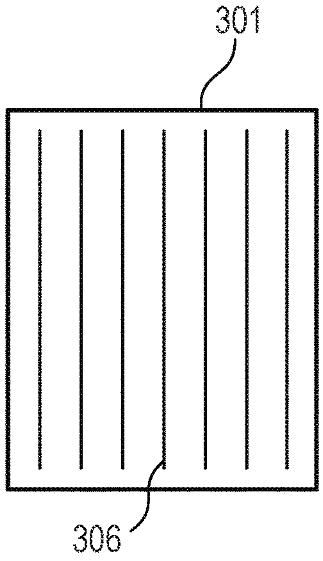
FIG. 1A, FIG. 1B, FIG. 1C, FIG. 1D, and FIG. 1E are each a view for illustrating an example of an image for describing a pattern memory.
Figure 1B:
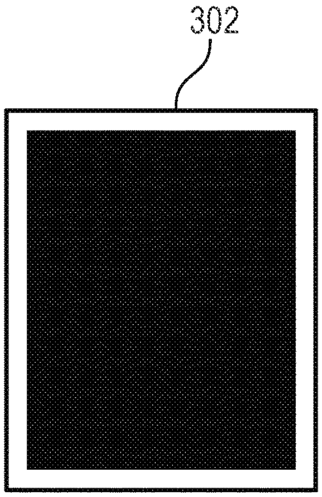
Figure 1D:
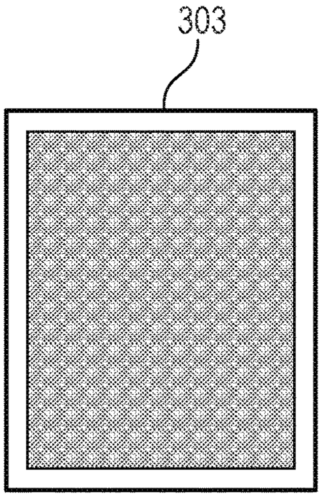
Figure 1C:
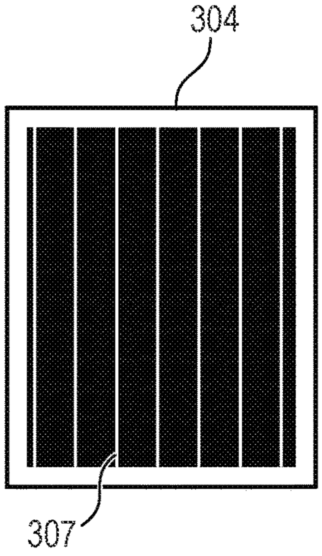
Figure 1E:
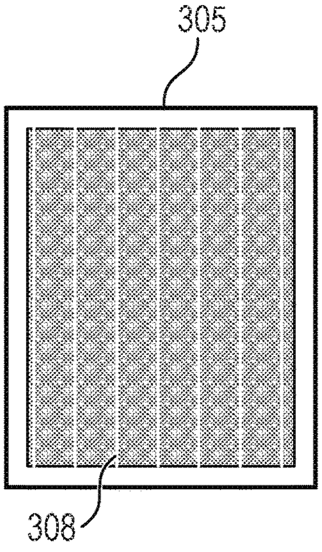

The present invention is described in detail below by way of exemplary embodiments.

A possible cause for the fact that when mass printing and high-speed printing are performed, an image failure called a pattern memory and an image failure called a ghost may occur at the time of the use of a related-art electrophotographic photosensitive member is as described below.

To correspond to the mass printing and the high-speed printing, the electrophotographic photosensitive member is required to have high sensitivity and high durability. In view of the foregoing, a substance having higher sensitivity has been used as a charge-generating substance to be incorporated into the electrophotographic photosensitive member.

In addition, along with an improvement in sensitivity of the charge-generating substance, the amount of charge to be generated increases. However, the related-art electrophotographic photosensitive member does not have a sufficient electron-conveying ability, and hence when the same image is output in a large number in a short time period, the charge may be liable to remain in an exposed portion in its photosensitive layer.

The inventors of the present invention have considered using a highly π-conjugated perylene imide for the purpose of improving an electron mobility with a view to suppressing a pattern memory and a ghost. However, when a film containing the perylene imide at a high concentration was simply formed, the electron mobility was not sufficiently improved in some cases.

The inventors have presumed the reason why the electron mobility was not sufficiently improved in some cases to be described below. Originally, the perylene imide assumes a rigid planar structure, and hence is liable to stack. Accordingly, when the content of the perylene imide serving as an electron-transporting material is high, a stack due to the planar structure of perylene is liable to be formed significantly. Accordingly, a nonuniform film state was formed, which caused the inhibition of an improvement in electron mobility in the film as a whole.

In view of the foregoing, the inventors have considered using a polymer having a repeating structural unit including a perylene imide structure as the perylene imide to make it difficult for a perylene imide structure moiety to stack. However, the inventors have found that the following cases exist: a case in which the electron mobility is improved only in a limited manner; and a case in which while the electron mobility is improved, and hence the pattern memory is alleviated, the suppression of the ghost is insufficient.

The inventors of the present invention have conceived the reason why while the pattern memory is alleviated, the suppression of the ghost is insufficient as follows: a difference in state in which the perylene imide structure contributing to electron transfer is present in a film may affect the suppression.

The inventors of the present invention have made a further investigation, and as a result, have found that when the above-mentioned polymer is a polymer having a specific structural unit to be described later, and having a glass transition temperature Tg of −10 to 50 °C, both of the pattern memory and the ghost can be alleviated.

Possible reasons why the use of the above-mentioned polymer can alleviate both of the pattern memory and the ghost are as described below. First, the following is conceivable: when the perylene imide was turned into a polymer, the stacking of the perylene imide structure moiety was able to be suppressed to a minimum, and hence the formation of a nonuniform film state was able to be suppressed. In addition, the inventors of the present invention have assumed that when the glass transition temperature Tg of the above-mentioned polymer is low in a uniform film state, the perylene imide is easily brought into a moderate oriented state, and hence the number of trap sites can be reduced.

Via the foregoing mechanism, even when the concentration of the perylene imide is increased, their molecules can have a moderate distance therebetween without being stacked, and hence the original effect of the increase in concentration is sufficiently exhibited. Thus, the inventors have achieved the suppression of the pattern memory and the ghost.

Specifically, the inventors of the present invention have found an electrophotographic photosensitive member characterized by including an electron-transporting layer containing a polymer having a structural unit represented by the formula (1), the formula (2), or the formula (3) to be described later, and having a glass transition temperature Tg of −10 to 50 °C.

The configuration of an electrophotographic photosensitive member according to the present invention is described in detail below.

[Electrophotographic Photosensitive Member]

Figure 3:
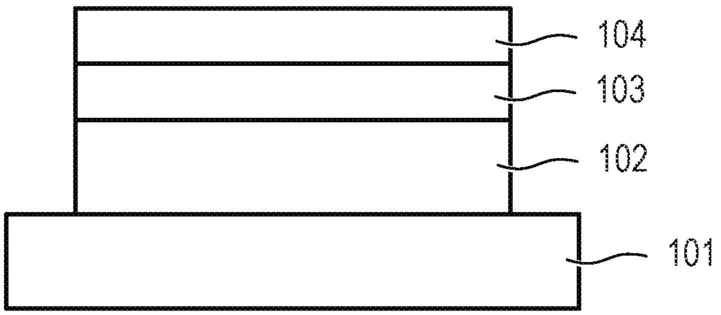
FIG. 3 is a view for illustrating an example of the layer configuration of an electrophotographic photosensitive member according to the present invention.

FIG. 3 is a view for illustrating an example of the layer configuration of the electrophotographic photosensitive member according to the present invention. The electrophotographic photosensitive member according to the present invention includes a support 101, an electron-transporting layer 102, a charge-generating layer 103, and a hole-transporting layer 104 in the stated order.

As a method of producing the electrophotographic photosensitive member according to the present invention, there is given a method involving preparing coating liquids for respective layers to be described later, applying the coating liquids in a desired order of the layers, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The support and the respective layers are described below.

<Support>

In the present invention, the electrophotographic photosensitive member includes a support. In the present invention, the support is preferably an electroconductive support having electroconductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, electroconductivity may be imparted to the resin or the glass through treatment involving, for example, mixing or coating the resin or the glass with an electroconductive material.

<Electroconductive Layer>

In the present invention, an electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles, and in particular, titanium oxide, tin oxide, and zinc oxide are more preferably used.

When the metal oxide is used as the electroconductive particles, the surface of the metal oxide may be treated with a silane coupling agent or the like, or the metal oxide may be doped with an element, such as phosphorus or aluminum, or an oxide thereof.

In addition, the electroconductive particles may each be of a laminated configuration having a core particle and a coating layer coating the particle. Examples of the core particle include titanium oxide, barium sulfate, and zinc oxide. The coating layer is, for example, a metal oxide such as tin oxide.

In addition, when the metal oxide is used as the electroconductive particles, their volume-average particle diameter is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, a silicone oil, resin particles, or a concealing agent such as titanium oxide.

The thickness of the electroconductive layer is preferably 1 to 50 μm, particularly preferably 3 to 40 μm.

The electroconductive layer may be formed by preparing a coating liquid for an electroconductive layer containing the above-mentioned materials and a solvent, forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision type high-speed disperser.

<Electron-Transporting Layer>

The electrophotographic photosensitive member according to the present invention includes the electron-transporting layer on the support or the electroconductive layer.

The electron-transporting layer contains a polymer having a structural unit represented by the following formula (1), the following formula (2), or the following formula (3), and the polymer has a glass transition temperature Tg of −10 to 50 °C:

(1)

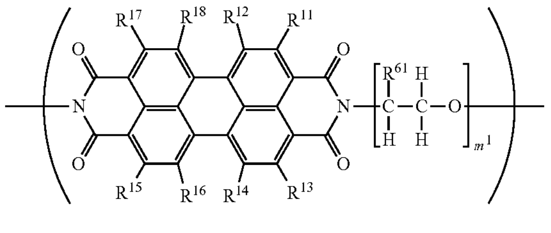

-continued (2)

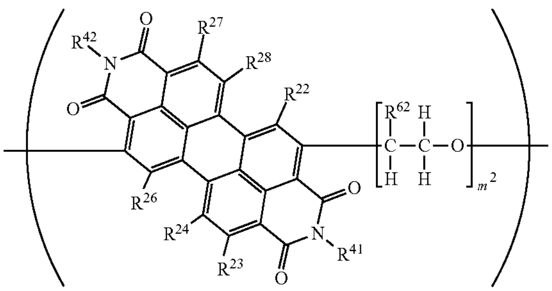

(3)

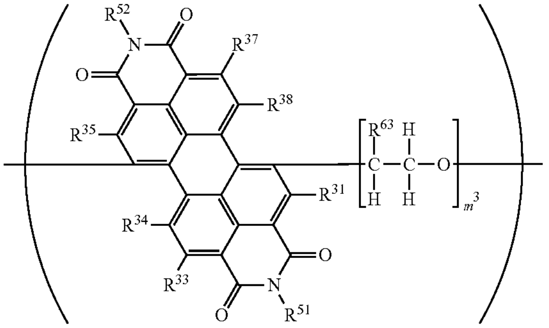

in the formula (1), $R^{11}$, $R^{12}$, $R^{13}$, $R^{14}$, $R^{15}$, $R^{16}$, $R^{17}$, and $R^{18}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{61}$ represents a hydrogen atom, or a substituted or unsubstituted alkyl group, and $m^1$ represents an integer of 2 to 16;

in the formula (2), $R^{22}$, $R^{23}$, $R^{24}$, $R^{26}$, $R^{27}$, and $R^{28}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{62}$ represents a hydrogen atom, or a substituted or unsubstituted alkyl group, $R^{41}$ and $R^{42}$ each independently represent a hydrogen atom, a substituted or unsubstituted alkyl group, or a substituted or unsubstituted aryl group, and $m^2$ represents an integer of 2 to 16; and in the formula (3), $R^{31}$, $R^{33}$, $R^{34}$, $R^{35}$, $R^{37}$, and $R^{38}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{63}$ represents a hydrogen atom, or a substituted or unsubstituted alkyl group, $R^{51}$ and $R^{52}$ each independently represent a hydrogen atom, a substituted or unsubstituted alkyl group, or a substituted or unsubstituted aryl group, and $m^3$ represents an integer of 2 to 16.

In each of the structural unit represented by the formula (1), the structural unit represented by the formula (2), and the structural unit represented by the formula (3), examples of the substituent that the substituted alkyl group has include an aryl group, a halogen atom, a nitro group, a cyano group, an amino group, and an alkoxy group.

In addition, examples of the substituent that the substituted aryl group has include a halogen atom, a nitro group, a cyano group, a trifluoromethyl group, an alkyl group, a halogen-substituted alkyl group, an alkoxy group, a hydroxy group, and a carboxyalkyl group.

In addition, examples of the substituent that the substituted alkoxy group has include a halogen atom, an aryl group, a nitro group, a cyano group, a trifluoromethyl group, an alkyl group, a halogen-substituted alkyl group, and an alkoxy group.

In addition, examples of the substituent that the substituted thiol group has include a halogen atom, an aryl group, a nitro group, a cyano group, a trifluoromethyl group, an alkyl group, a halogen-substituted alkyl group, and an alkoxy group.

In addition, examples of the substituent that the substituted amino group has include a halogen atom, a nitro group, a cyano group, a trifluoromethyl group, an alkyl group, a halogen-substituted alkyl group, and an alkoxy group.

In addition, examples of the substituent that the substituted alkynyl group has include a halogen atom, a nitro group, a cyano group, a trifluoromethyl group, an alkyl group, a halogen-substituted alkyl group, and an alkoxy group.

In each of the structural unit represented by the formula (1), the structural unit represented by the formula (2), and the structural unit represented by the formula (3), specific examples of the substituted or unsubstituted alkyl group include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a tert-pentyl group, a cyclopentyl group, a n-hexyl group, a 1-methylpentyl group, a 4-methyl-2-pentyl group, a 3,3-dimethylbutyl group, a 2-ethylbutyl group, a cyclohexyl group, a hexyl group, an isohexyl group, a heptyl group, an octyl group, a nonyl group, a decyl group, an undecyl group, a dodecyl group, a tridecyl group, a tetradecyl group, a hexadecyl group, a heptadecyl group, an octadecyl group, a nonadecyl group, an icosyl group, a henicosyl group, a triacontyl group, a benzyl group, and a trityl group.

In addition, specific examples of the substituted or unsubstituted alkynyl group include an ethynyl group, a propynyl group, a butynyl group, a pentynyl group, a hexynyl group, a heptynyl group, and an octynyl group.

In addition, specific examples of the substituted or unsubstituted aryl group include a phenyl group, a biphenyl group, a fluorenyl group, a 1-naphthyl group, a 2-naphthyl group, and a tolyl group.

In addition, specific examples of the substituted or unsubstituted alkoxy group include a methoxy group, an ethoxy group, a propoxy group, a tert-butoxy group, a phenoxy group, a pentyloxy group, a cyclohexyloxy group, a benzyloxy group, an allyloxy group, and a 1-naphthyloxy group.

Specific examples of the substituted or unsubstituted thiol group include a thiol group (sulfanyl group), a methylthio group, an ethylthio group, a propylthio group, a butylthio group, a pentylthio group, a hexylthio group, a heptylthio group, an octylthio group, and a phenylthio group.

Specific examples of the substituted or unsubstituted amino group include an amino group, a methylamino group, a dimethylamino group, a trimethylamino group, an ethylamino group, a diethylamino group, a propylamino group, an isopropylamino group, a butylamino group, a pentylamino group, a hexylamino group, a heptylamino group, an octylamino group, a phenylamino group, and a pyrrolidinyl group.

$m^1$ in the formula (1), $m^2$ in the formula (2), and $m^3$ in the formula (3) each preferably represent an integer of 2 to 6 because the concentration of a perylene imide structure moiety can be increased, and hence a pattern memory can be more effectively suppressed.

When $m^1$ in the formula (1), $m^2$ in the formula (2), and $m^3$ in the formula (3) each represent 6 or less, the concentration of the perylene imide structure moiety can be increased, and hence the pattern memory can be effectively suppressed.

In addition, $R^{61}$ in the formula (1), $R^{62}$ in the formula (2), and $R^{63}$ in the formula (3) each preferably represent a methyl group because a perylene imide structure is easily brought into a uniform oriented state.

Specific examples of the structural unit represented by the formula (1), the structural unit represented by the formula (2), and the structural unit represented by the formula (3) are shown in Table 1 to Table 4 below.

TABLE 1

| | $R^{11}$ | $R^{12}$ | $R^{13}$ | $R^{14}$ | $R^{15}$ | $R^{16}$ | $R^{17}$ | $R^{18}$ | $R^{61}$ | $m^1$ |
|---|---|---|---|---|---|---|---|---|---|---|
| A101 | H | H | H | H | H | H | H | H | $CH_3$ | 2 |
| A102 | H | H | H | H | H | H | H | H | $CH_3$ | 3 |
| A103 | H | H | H | H | H | H | H | H | $CH_3$ | 5 |
| A104 | H | H | H | H | H | H | H | H | $CH_3$ | 8 |
| A105 | H | H | H | H | H | H | H | H | $CH_3$ | 16 |
| A106 | H | H | H | H | H | H | CN | H | $CH_3$ | 5 |
| A107 | H | Cl | H | Cl | H | Cl | H | Cl | $CH_3$ | 6 |
| A108 | H | CN | H | H | H | CN | H | H | $CH_3$ | 5 |
| A109 | $CF_3$ | H | H | H | H | H | $CF_3$ | H | $CH_3$ | 5 |
| A110 | H | $NO_2$ | H | H | H | $NO_2$ | H | H | $CH_3$ | 6 |
| A111 | H | SH | H | H | H | SH | H | H | $CH_3$ | 5 |
| A112 | H | $—S—C_3H_7$ | H | H | H | $—S—C_3H_7$ | H | H | $CH_3$ | 4 |
| A113 | H | H | H | $—OCH_3$ | H | H | H | H | $CH_3$ | 5 |
| A114 | H | $NH_2$ | H | H | H | $NH_2$ | H | H | $CH_3$ | 5 |
| A115 | H | 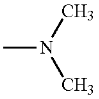 | H | H | H | H | H | H | $CH_3$ | 5 |
| A116 | H | —C≡CH | H | H | H | —C≡CH | H | H | $CH_3$ | 4 |
| A117 | H | 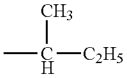 | H | H | H | 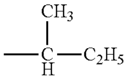 | H | H | $CH_3$ | 4 |
| A118 | H | $—C_4H_9$ | H | H | H | $—C_4H_9$ | H | H | $CH_3$ | 16 |
| A119 | H | 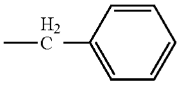 | H | H | H | 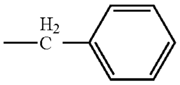 | H | H | $CH_3$ | 14 |
| A120 | H | 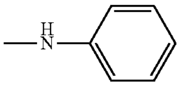 | H | H | H | 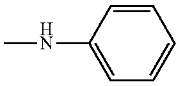 | H | H | $CH_3$ | 6 |

TABLE 2

| | $R^{11}$ | $R^{12}$ | $R^{13}$ | $R^{14}$ | $R^{15}$ | $R^{16}$ | $R^{17}$ | $R^{18}$ | $R^{61}$ | $m^1$ |
|---|---|---|---|---|---|---|---|---|---|---|
| A121 | 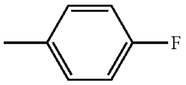 | H | H | H | H | H | H | H | $CH_3$ | 8 |
| A122 | H | Br | H | H | H | Br | H | H | $CH_3$ | 6 |
| A123 | H | Br | H | H | H | Br | H | H | H | 2 |
| A124 | H | Br | H | H | H | Br | H | H | $C_2H_5$ | 4 |
| A125 | H | Br | H | H | H | Br | H | H | $C_3H_7$ | 4 |
| A126 | H | 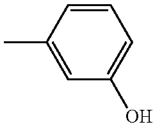 | H | H | H | H | H | H | $CH_3$ | 6 |

TABLE 2-continued
| | $R^{11}$ | $R^{12}$ | $R^{13}$ | $R^{14}$ | $R^{15}$ | $R^{16}$ | $R^{17}$ | $R^{18}$ | $R^{61}$ | $m^1$ |
|---|---|---|---|---|---|---|---|---|---|---|
| A127 | H | 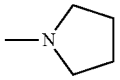 | H | H | H | 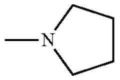 | H | H | $CH_3$ | 6 |
| A128 | H | 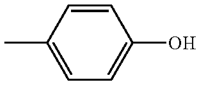 | H | H | H | 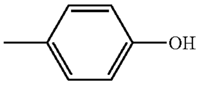 | H | H | $CH_3$ | 4 |
| A129 | H | 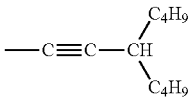 | H | H | H | 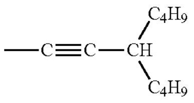 | H | H | $CH_3$ | 3 |
| A130 | H | Cl | H | Cl | H | Cl | H | Cl | $CH_3$ | 2 |
| A131 | H | Cl | H | Cl | H | Cl | H | Cl | $CH_3$ | 3 |
| A132 | H | Cl | H | Cl | H | Cl | H | Cl | $CH_3$ | 4 |
| A133 | H | Cl | H | Cl | H | Cl | H | Cl | $CH_3$ | 5 |
| A134 | H | Cl | H | Cl | H | Cl | H | Cl | $CH_3$ | 7 |
| A135 | H | Cl | H | Cl | H | Cl | H | Cl | $CH_3$ | 8 |
| A136 | H | Cl | H | Cl | H | Cl | H | Cl | $CH_3$ | 16 |
| A137 | H | Cl | H | Cl | H | Cl | H | Cl | $CH_3$ | 10 |

TABLE 3
| | $R^{22}$ | $R^{23}$ | $R^{24}$ | $R^{26}$ | $R^{27}$ | $R^{28}$ | $R^{41}$ | $R^{42}$ | $R^{62}$ | $m^2$ |
|---|---|---|---|---|---|---|---|---|---|---|
| A201 | Br | H | H | Br | H | H | H | H | $CH_3$ | 6 |
| A202 | Cl | H | Cl | Cl | H | Cl | $CH_3$ | $CH_3$ | $CH_3$ | 5 |
| A203 | Cl | H | Cl | Cl | H | Cl | 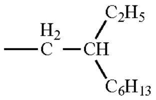 | 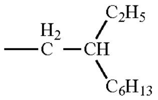 | H | 4 |
| A204 | Cl | H | Cl | Cl | H | Cl | $-CH_2NH_2$ | $-CH_2NH_2$ | H | 4 |
| A205 | H | H | H | H | H | H | 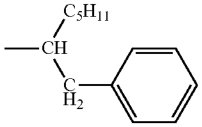 | 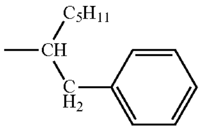 | H | 4 |
| A206 | Br | H | H | H | Br | H | 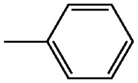 | 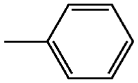 | H | 4 |
| A207 | Br | H | H | H | Br | H | 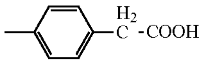 | 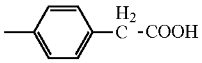 | H | 4 |
| A208 | Br | H | H | H | Br | H | 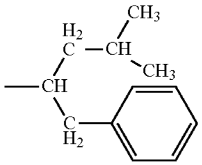 | 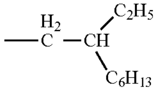 | $CH_3$ | 2 |
| A209 | Cl | H | Cl | Cl | H | Cl | $CH_3$ | $CH_3$ | $CH_3$ | 3 |
| A210 | Cl | H | Cl | Cl | H | Cl | $CH_3$ | $CH_3$ | $CH_3$ | 8 |
| A211 | Cl | H | Cl | Cl | H | Cl | $CH_3$ | $CH_3$ | $CH_3$ | 10 |
| A212 | H | H | H | H | H | H | 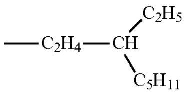 | 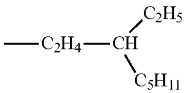 | $CH_3$ | 6 |
| A213 | 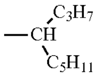 | H | H | H | H | H | H | H | $CH_3$ | 6 |

TABLE 3-continued
| | $R^{22}$ | $R^{23}$ | $R^{24}$ | $R^{26}$ | $R^{27}$ | $R^{28}$ | $R^{41}$ | $R^{42}$ | $R^{62}$ | $m^2$ |
|---|---|---|---|---|---|---|---|---|---|---|
| A214 | CN | H | H | H | CN | H | H | H | $CH_3$ | 6 |
| A215 | 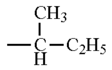 | H | H | H | 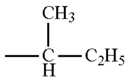 | H | H | H | $CH_3$ | 5 |
| A216 | 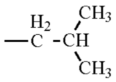 | H | H | H | 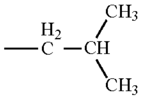 | H | H | H | $CH_3$ | 4 |
| A217 | H | H | H | H | H | 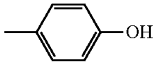 | H | H | $CH_3$ | 8 |
| A218 | H | H | H | H | 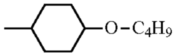 | H | H | H | $C_2H_5$ | 3 |
| A219 | $-C\equiv CH$ | H | H | H | $-C\equiv CH$ | H | H | H | $C_3H_7$ | 3 |
| A220 | $NO_2$ | H | H | H | $NO_2$ | H | 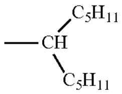 | 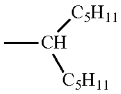 | $CH_3$ | 3 |

TABLE 4

| | $R^{31}$ | $R^{33}$ | $R^{34}$ | $R^{35}$ | $R^{37}$ | $R^{38}$ | $R^{51}$ | $R^{52}$ | $R^{63}$ | $m^3$ |
|---|---|---|---|---|---|---|---|---|---|---|
| A301 | H | H | H | H | H | H | H | H | $CH_3$ | 6 |
| A302 | H | H | H | H | H | H | 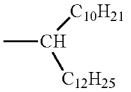 | 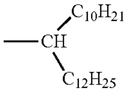 | $CH_3$ | 5 |
| A303 | H | H | Cl | H | H | Cl | 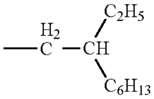 | 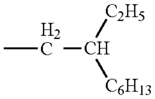 | $CH_3$ | 6 |
| A304 | H | H | Cl | H | H | Cl | 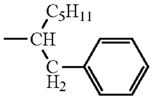 | 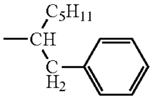 | $CH_3$ | 6 |
| A305 | H | H | H | H | H | H | 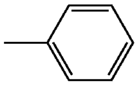 | 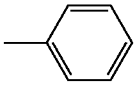 | $CH_3$ | 6 |
| A306 | H | H | H | H | H | H | 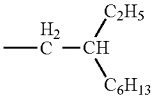 | 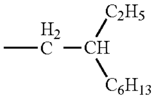 | $CH_3$ | 6 |
| A307 | H | H | H | H | H | H | 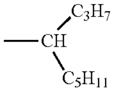 | 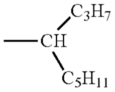 | $CH_3$ | 6 |
| A308 | H | H | H | H | H | H | 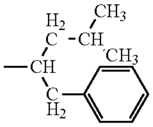 | 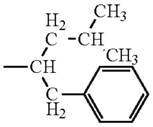 | $CH_3$ | 6 |
| A309 | H | H | Br | H | H | Br | $CH_3$ | $CH_3$ | $CH_3$ | 2 |
| A310 | H | H | Br | H | H | Br | $CH_3$ | $CH_3$ | $CH_3$ | 6 |
| A311 | H | H | Br | H | H | Br | $CH_3$ | $CH_3$ | $CH_3$ | 12 |
| A312 | H | H | 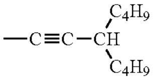 | H | H | 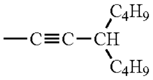 | H | H | $CH_3$ | 6 |
| A313 | H | H | $NO_2$ | H | H | $NO_2$ | H | H | $CH_3$ | 6 |
| A314 | CN | H | H | H | H | H | H | H | $CH_3$ | 6 |
| A315 | H | H | $OCH_3$ | H | H | $OCH_3$ | H | H | $CH_3$ | 6 |
| A316 | $CF_3$ | H | H | H | $CF_3$ | H | H | H | $CH_3$ | 6 |
| A317 | H | $C_4H_9$ | H | H | $C_4H_9$ | H | H | H | H | 16 |
| A318 | H | H | H | H | H | H | H | H | $CH_3$ | 10 |
| A319 | H | H | Cl | H | H | Cl | H | H | H | 5 |
| A320 | H | H | Br | H | H | Br | H | H | 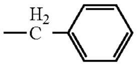 | 6 |

The weight-average molecular weight of the polymer having the structural unit represented by the formula (1), the formula (2), or the formula (3) is preferably 30,000 or less.

When the weight-average molecular weight of the polymer is 30,000 or less, the perylene imide structure is easily brought into an appropriate oriented state, and hence a ghost can be more effectively suppressed.

The glass transition temperature Tg of the polymer having the structural unit represented by the formula (1), the formula (2), or the formula (3) was measured under the following conditions.

The temperature at the point of intersection of a tangent to a temperature region before a changing point in an endothermic peak, which appears at the time of the second temperature increase to 200 °C under the following temperature conditions, and a tangent to a temperature region after the changing point is adopted as the glass transition temperature Tg described in the present application.

[Glass Transition Point Measurement]

Measurement apparatus used: X-DSC7000 manufactured by Hitachi High-Tech Science Corporation Temperature Conditions:

the temperature is decreased at 10 °C/min from 25 °C to −50 °C, maintained at −50 °C for 5 minutes, increased at 10 °C/min from −50 °C to 200 °C, maintained at 200 °C for 10 minutes, decreased at 50 °C/min from 200 °C to −50 °C, maintained at −50 °C for 10 minutes, and increased at 10 °C/min from −50 °C to 200 °C.

Sample amount: about 2 mg

Measurement environment: under $N_2$ gas stream

Specific examples of the polymer having the structural unit represented by the formula (1), (2), or (3), and their weight-average molecular weights and glass transition temperatures Tg are shown in Table 5 below.

TABLE 5

| | Polymer | | | |
|---|---|---|---|---|
| | Structural unit | Polymerization degree | Molecular weight | Tg (°C) |
| Polymer 1 | A101 | 7 | 3,875 | 42 |
| Polymer 2 | A122 | 7 | 6,619 | 27 |
| Polymer 3 | A110 | 7 | 6,129 | 27 |
| Polymer 4 | A108 | 8 | 6,216 | 35 |
| Polymer 5 | A114 | 8 | 6,056 | 35 |
| Polymer 6 | A117 | 10 | 7,802 | 47 |
| Polymer 7 | A107 | 9 | 8,321 | 35 |
| Polymer 8 | A109 | 7 | 6,451 | 27 |
| Polymer 9 | A120 | 7 | 6,787 | 27 |
| Polymer 10 | A111 | 8 | 6,344 | 35 |
| Polymer 11 | A113 | 10 | 7,862 | 43 |
| Polymer 12 | A116 | 7 | 5,443 | 31 |
| Polymer 13 | A115 | 7 | 5,681 | 31 |
| Polymer 14 | A203 | 7 | 6,269 | 35 |
| Polymer 15 | A209 | 7 | 5,457 | 38 |
| Polymer 16 | A212 | 7 | 6,486 | 27 |
| Polymer 17 | A215 | 7 | 5,905 | 31 |
| Polymer 18 | A220 | 7 | 7,081 | 38 |
| Polymer 19 | A302 | 8 | 10,984 | 35 |
| Polymer 20 | A304 | 8 | 9,928 | 31 |
| Polymer 21 | A306 | 10 | 10,662 | 39 |
| Polymer 22 | A307 | 12 | 12,452 | 50 |
| Polymer 23 | A309 | 5 | 3,717 | 34 |
| Polymer 24 | A130 | 7 | 4,855 | 42 |
| Polymer 25 | A131 | 7 | 5,261 | 38 |
| Polymer 26 | A132 | 7 | 5,667 | 35 |
| Polymer 27 | A133 | 7 | 6,073 | 31 |
| Polymer 28 | A134 | 7 | 6,885 | 24 |
| Polymer 29 | A135 | 7 | 7,291 | 20 |
| Polymer 30 | A136 | 7 | 10,539 | −10 |
| Polymer 31 | A123 | 7 | 4,799 | 42 |
| Polymer 32 | A124 | 7 | 6,199 | 27 |
| Polymer 33 | A125 | 7 | 6,591 | 27 |
| Polymer 34 | A136 | 18 | 27,050 | 35 |
| Polymer 35 | A136 | 30 | 30,052 | 43 |
| Polymer 36 | A135 | 4 | 4,180 | 8 |
| Polymer 37 | A137 | 4 | 4,644 | 0 |

In order that the perylene imide structure of the above-mentioned polymer may be brought into a moderate oriented state that provides the effect of the present invention, a CuKα characteristic X-ray diffraction pattern obtained for the electron-transporting layer preferably has a peak at a position of 2θ=7.5°±2.5° (where θ represents a Bragg angle).

The X-ray diffraction measurement was performed under the following conditions.

(X-ray Diffraction Measurement)

Measurement apparatus used: X-ray diffractometer RINT-TTRII manufactured by

Rigaku Corporation

X-ray tube: Cu

X-ray wavelength: Kα1

Tube voltage: 50 KV

Tube current: 300 mA

Scanning method: θ scan

Scanning speed: 4.0°/min

Sampling interval: 0.02°

Start angle 2θ: 3.0°

Stop angle 2θ: 35.0°

Goniometer: rotor horizontal goniometer (TTR-2)

Attachment: capillary rotary sample stage

Filter: none

Detector: scintillation counter

Incident monochromator: used

Slit: adjustable slit (parallel beam method)

Counter monochromator: not used

Divergence slit: open

Divergence longitudinal restriction slit: 10.00 mm

Scattering slit: open

Light receiving slit: open

A coating liquid for an electron-transporting layer may comprise a crosslinking agent in addition to the polymer having the structural unit represented by the formula (1), the formula (2), or the formula (3), and having a glass transition temperature Tg of −10 to 50 °C.

Any known material may be used as the crosslinking agent. Specific examples thereof include compounds described in "Crosslinking Agent Handbook" edited by Shinzo Yamashita and Tosuke Kaneko and published by Taiseisha Ltd. (1981).

In the present invention, the crosslinking agent is preferably an isocyanate compound having an isocyanate group or a blocked isocyanate group, or an amine compound having an N-methylol group or an alkyl-etherified N-methylol group. Of those, an isocyanate compound having 2 to 6 isocyanate groups or blocked isocyanate groups is preferred.

Examples of the isocyanate compound serving as the crosslinking agent include isocyanate compounds described below, but the present invention is not limited thereto. In addition, the isocyanate compounds described below may be used in combination.

Examples of the isocyanate compound include triisocyanatobenzene, triisocyanatomethylbenzene, triphenylmethane triisocyanate, lysine triisocyanate, diisocyanates, such as tolylene diisocyanate, hexamethylene diisocyanate, dicyclohexylmethane diisocyanate, naphthalene diisocyanate, diphenylmethane diisocyanate, isophorone diisocyanate, xylylene diisocyanate, 2,2,4-trimethylhexamethylene diisocyanate, methyl-2,6-diisocyanate hexanoate, and norbornane diisocyanate, isocyanurate modified forms thereof, biuret modified forms thereof, and allophanate modified forms thereof, and adduct modified forms thereof with trimethylolpropane or pentaerythritol. The blocked isocyanate group is a group having a structure represented by —$NHCOX^1$ ($X^1$ represents a protective group). $X^1$ represents any protective group capable of being introduced into an isocyanate group.

Examples of a commercially available isocyanate compound include isocyanate-based crosslinking agents, such as DURANATE MFK-60B, SBA-70B, 17B-60P, SBN-70D, or SBB-70P manufactured by Asahi Kasei Corporation, and Desmodur BL3175 or BL3475 manufactured by Sumika Bayer Urethane Co., Ltd.

The amine compound serving as the crosslinking agent preferably has an N-methylol group or an alkyl-etherified N-methylol group. In addition, an amine compound having a plurality of (two or more)N-methylol groups or alkyl-etherified N-methylol groups is more preferred. Examples of the amine compound include methylolated melamine, a methylolated guanamine, a methylolated urea derivative, a methylolated ethyleneurea derivative, methylolated glycoluril, and a compound having an alkyl-etherified methylol moiety, and derivatives thereof.

Examples of a commercially available amine compound (crosslinking agent), include SUPER MELAMI No. 90 (manufactured by NOF Corporation (former Nippon Oil & Fats Co., Ltd.)), SUPER BECKAMINE (trademark) TD-139-60, L-105-60, L127-60, L110-60, J-820-60, and G-821-60 (manufactured by DIC Corporation), U-VAN 2020 (Mitsui Chemicals, Inc.), Sumitex Resin M-3 (manufactured by Sumitomo Chemical Co., Ltd. (former Sumitomo Chemical Industry Co., Ltd.)), NIKALAC MW-30, MW-390, and MX-750LM (manufactured by Sanwa Chemical Co., Ltd.), SUPER BECKAMINE (trademark) L-148-55, 13-535, L-145-60, and TD-126 (manufactured by DIC Corporation), NIKALAC BL-60 and BX-4000 (manufactured by Sanwa Chemical Co., Ltd.), and NIKALAC MX-280, NIKALAC MX-270, and NIKALAC MX-290 (manufactured by Sanwa Chemical Co., Ltd.).

In the present invention, the content of the polymer having the structural unit represented by the formula (1), the formula (2), or the formula (3) with respect to the total mass of the electron-transporting layer is preferably 50 mass % or more from the viewpoint of improving an electron mobility in the electron-transporting layer. In addition, the content of the polymer having the structural unit represented by the formula (1), the formula (2), or the formula (3) with respect to the total mass of the electron-transporting layer is more preferably 70 mass % or more.

The electron-transporting layer may contain a resin. In addition, the electron-transporting layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxyl group, a hydroxy group, an amino group, a carboxy group, a thiol group, a carboxylic acid anhydride group, and a carbon-carbon double bond group.

In addition, the electron-transporting layer may further contain metal oxide particles, metal particles, an electroconductive polymer, and the like for the purpose of improving electric characteristics. Of those, metal oxide particles are preferably used.

Examples of the metal oxide particles include particles of indium tin oxide, tin oxide, indium oxide, titanium oxide, strontium titanate, zinc oxide, and aluminum oxide. Particles of silicon dioxide may also be used. Examples of the metal particles include particles of gold, silver, and aluminum.

The metal oxide particles to be incorporated into the electron-transporting layer may be subjected to surface treatment with a surface treatment agent such as a silane coupling agent before use.

A general method is used as a method of subjecting the metal oxide particles to the surface treatment. Examples thereof include a dry method and a wet method.

The dry method includes, while stirring the metal oxide particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method includes stirring the metal oxide particles and the surface treatment agent in a solvent, or dispersing the metal oxide particles and the surface treatment agent in a solvent with a sand mill or the like using glass beads or the like. After the dispersion, the solvent is removed by filtration or evaporation under reduced pressure. After the removal of the solvent, it is preferred to further perform baking at 100 °C or more.

The electron-transporting layer may further contain an additive, and for example, may contain a known material, such as: metal particles such as aluminum particles; electroconductive particles such as carbon black; a hole-transporting substance; a metal chelate compound; or an organometallic compound.

The thickness of the electron-transporting layer is preferably 0.1 to 10 μm, more preferably 0.5 to 5 μm.

The volume resistivity of the electron-transporting layer is preferably $1\times10^{10}$ Ω·cm or more, more preferably $1\times10^{12}$ Ω·cm or more because the electron-transporting layer has a function of suppressing the injection of charge from the support or the electroconductive layer.

The electron-transporting layer may be formed by: preparing a coating liquid for an electron-transporting layer comprising the above-mentioned materials and a solvent; forming a coating film thereof, and drying and/or curing the coating film. Examples of the solvent to be used for the coating liquid include an alcohol-based solvent, a ketone-based solvent, an ether-based solvent, an ester-based solvent, and an aromatic hydrocarbon-based solvent. A dispersion method for preparing the coating liquid for an electron-transporting layer is, for example, a method comprising using a homogenizer, an ultrasonic disperser, a ball mill, a sand mill, a roll mill, a vibration mill, an attritor, or a liquid collision type high-speed disperser.

A temperature at the time of the heat drying of the coating film of the coating liquid for an electron-transporting layer is preferably a temperature of from 100 °C to 200 °C.

<Charge-Generating Layer>

The charge-generating layer preferably contains a charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably 40 to 85 mass %, more preferably 60 to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The thickness of the charge-generating layer is preferably 0.1 to 1 μm, more preferably 0.15 to 0.4 μm.

The charge-generating layer may be formed by: preparing a coating liquid for a charge-generating layer containing the above-mentioned materials and a solvent; forming a coating film thereof, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

<Hole-Transporting Layer>

The hole-transporting layer preferably contains a hole-transporting substance and a resin.

Examples of the hole-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the hole-transporting substance in the hole-transporting layer is preferably 25 to 70 mass %, more preferably 30 to 55 mass % with respect to the total mass of the hole-transporting layer.

Examples of the resin include a polyester resin, a polycarbonate resin, an acrylic resin, and a polystyrene resin. Of those, a polycarbonate resin and a polyester resin are preferred. The polyester resin is particularly preferably a polyarylate resin.

A content ratio (mass ratio) between the hole-transporting substance and the resin is preferably from 4:10 to 20:10, more preferably from 5:10 to 12:10.

In addition, the hole-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluororesin particles, polystyrene resin particles, polyethylene resin particles, silica particles, alumina particles, and boron nitride particles.

The thickness of the hole-transporting layer is preferably 5 to 50 μm, more preferably 8 to 40 μm, particularly preferably 10 to 30 μm.

The hole-transporting layer may be formed by: preparing a coating liquid for a hole-transporting layer containing the above-mentioned materials and a solvent; forming a coating film thereof, and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

<Protective Layer>

In the present invention, a protective layer may be arranged on the hole-transporting layer. The arrangement of the protective layer can improve durability.

It is preferred that the protective layer contain electroconductive particles and/or a hole-transporting substance, and a resin.

Examples of the electroconductive particles include particles of metal oxides, such as titanium oxide, zinc oxide, tin oxide, and indium oxide.

Examples of the hole-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protective layer may be formed as a cured film by polymerizing a composition containing a monomer having a polymerizable functional group. A reaction at that time is, for example, a thermal polymerization reaction, a photopolymerization reaction, or a radiation polymerization reaction. Examples of the polymerizable functional group of the monomer having a polymerizable functional group include an acrylic group and a methacrylic group. A material having a hole-transporting ability may be used as the monomer having a polymerizable functional group.

The protective layer may contain an additive, such as an antioxidant, a UV absorber, a plasticizer, a leveling agent, a slipperiness-imparting agent, or a wear resistance-improving agent. Specific examples of the additive include a hindered phenol compound, a hindered amine compound, a sulfur compound, a phosphorus compound, a benzophenone compound, a siloxane-modified resin, a silicone oil, fluororesin particles, polystyrene resin particles, polyethylene resin particles, silica particles, alumina particles, and boron nitride particles.

The thickness of the protective layer is preferably 0.5 to 10 μm, more preferably 1 to 7 μm.

The protective layer may be formed by: preparing a coating liquid for a protective layer containing the above-mentioned materials and a solvent; forming a coating film thereof, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Method of Producing Electrophotographic Photosensitive Member]

A method of producing an electrophotographic photosensitive member according to the present invention is a method of producing an electrophotographic photosensitive member comprising a support, an electron-transporting layer, a charge-generating layer, and a hole-transporting layer in the stated order. The production method includes a step of forming a coating film of a coating liquid for an electron-transporting layer, followed by the drying and/or curing of the coating film to form the electron-transporting layer. In addition, the coating liquid for an electron-transporting layer is characterized in that the liquid comprises a polymer having a structural unit represented by the formula (1), the formula (2), or the formula (3), and the polymer has a glass transition temperature Tg of −10 to 50 °C.

[Process Cartridge and Electrophotographic Apparatus]

A process cartridge according to the present invention is characterized by integrally supporting the electrophotographic photosensitive member described in the foregoing, and at least one unit selected from the group consisting of: a charging unit; a developing unit; and a cleaning unit, and being detachably attachable to the main body of an electrophotographic apparatus.

In addition, an electrophotographic apparatus according to the present invention is characterized by including: the electrophotographic photosensitive member described in the foregoing; a charging unit; an exposing unit; a developing unit; and a transfer unit.

Figure 4:
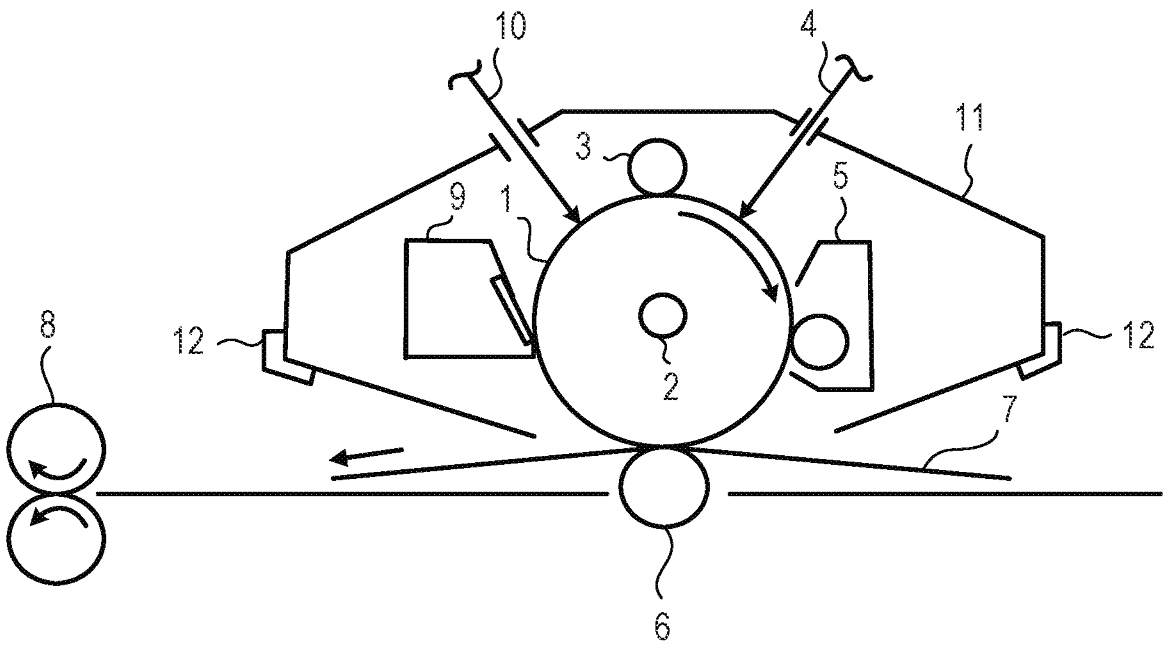
FIG. 4 is a view for illustrating an example of the schematic configuration of an electrophotographic apparatus including a process cartridge including the electrophotographic photosensitive member according to the present invention.

An example of the schematic configuration of an electrophotographic apparatus including the process cartridge including the electrophotographic photosensitive member is illustrated in FIG. 4.

An electrophotographic photosensitive member 1 of a cylindrical shape is rotationally driven about a shaft 2 in a direction indicated by the arrow at a predetermined peripheral speed. The surface of the electrophotographic photosensitive member 1 is charged to a positive or negative predetermined potential by a charging unit 3. Although a roller charging system based on a roller type charging member is illustrated in the figure, a charging system, such as a corona charging system, a contact charging system, or an injection charging system, may be adopted. The charged surface of the electrophotographic photosensitive member 1 is irradiated with exposure light 4 from an exposing unit (not shown), and thus an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit such as the toner remaining on the surface of the electrophotographic photosensitive member 1 after the transfer. In addition, a so-called cleaner-less system configured to remove the deposit with the developing unit 5 or the like without separate arrangement of the cleaning unit 9 may be used. The electrophotographic apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12 such as a rail may be arranged for detachably attaching a process cartridge 11 according to the present invention onto the main body of the electrophotographic apparatus.

The electrophotographic photosensitive member of the present invention may be used in, for example, a laser beam printer, an LED printer, a copying machine, a facsimile, and a multifunction machine thereof.

According to the present invention, there can be provided the electrophotographic photosensitive member that can suppress the occurrence of a pattern memory and a ghost, the method of producing the electrophotographic photosensitive member, the process cartridge including the electrophotographic photosensitive member, and the electrophotographic apparatus including the electrophotographic photosensitive member.

EXAMPLES

The present invention is described in more detail below by way of Examples and Comparative Examples. The present invention is by no means limited to the following Examples as long as its modifications do not deviate from the gist of the present invention. In the following description of Examples, the term "part(s)" is on a mass basis unless otherwise stated.

First, a synthesis example of a polymer is described.

Synthesis Example of Polymer 1

The following materials were prepared.

3,4,9,10-Perylenetetracarboxylic dianhydride (manufactured by Tokyo Chemical Industry Co., Ltd.): 1.96 parts Poly(propylene glycol) bis(2-aminopropyl ether) (Mn: 230, manufactured by Sigma-Aldrich): 1.38 parts Those materials were mixed in 50 parts of N-methylpyrrolidone, and the mixture was heated to 180 °C while being stirred. The mixture was subjected to a reaction for 48 hours, and was then cooled and poured into 50 mL of water, followed by the separation of a precipitate by filtration. The resultant precipitate was washed with hot water, and was then dried to provide 3.0 parts of a perylene imide polymer 1. The resultant compound was identified by NMR. At the time of the identification, peak positions were measured by $^1$H-NMR (400 MHz, JMN-EX400, manufactured by JEOL Ltd.) through use of $CDCl_3$ as a solvent. As a result, a target product having the following peak positions was identified.

δ 8.6-7.8 ppm (broad m, perylene moiety)

δ 4.3-4.1 ppm (broad m, alkyl moiety linked to imide nitrogen)

δ 4.0-3.2 ppm (broad m, ether moiety)

δ 1.60-1.11 ppm (broad s, methyl group)

The weight-average molecular weight of the resultant polymer is shown in Table 5. The weight-average molecular weight (Mw) was measured by gel permeation chromatography (GPC), and a value in terms of polystyrene measured with HLC-8220 manufactured by Tosoh Corporation was adopted.

Example 1

[Production of Electrophotographic Photosensitive Member]

<Support>

An aluminum cylinder having a length of 260.5 mm and a diameter of 30 mm was prepared. The aluminum cylinder was subjected to cutting processing (JIS B 0601:2014, ten-point average roughness Rzjis: 0.8 m), and the processed aluminum cylinder was used as a support (electroconductive support).

<Electron-Transporting Layer>

Next, the following materials were prepared.

Polymer 1 serving as an electron-transporting substance: 5 parts

Blocked isocyanate compound serving as a crosslinking agent (product name: SBB-70P (solid content: 70%), isocyanate:blocking group=6.7:3.3 (mass ratio), manufactured by Asahi Kasei Corporation): 2 parts Those materials were dissolved in a mixed solvent containing 48 parts of chloroform and 24 parts of o-xylene. The resultant coating liquid for an electron-transporting layer was applied onto the support by dip coating, and the resultant coating film was dried by being heated at 170 °C for 40 minutes. Thus, an electron-transporting layer having a thickness of 2.0 μm was formed.

<Charge-Generating Layer>

Next, a hydroxygallium phthalocyanine crystal (charge-generating substance) of a crystal form having peaks at Bragg angles (2θ±0.2°) of 7.5°, 9.9°, 12.5°, 16.3°, 18.6°, 25.1°, and 28.3° in CuKα characteristic X-ray diffraction was prepared. 10 Parts of the hydroxygallium phthalocyanine crystal, 5 parts of a polyvinyl butyral resin (product name: S-LEC BX-1, manufactured by Sekisui Chemical Co., Ltd.), and 250 parts of cyclohexanone were loaded into a sand mill using glass beads each having a diameter of 1 mm, and were subjected to dispersion treatment for 2 hours. Next, 250 parts of ethyl acetate was added to the resultant to prepare a coating liquid for a charge-generating layer. The coating liquid for a charge-generating layer was applied onto the electron-transporting layer by dip coating to form a coating film, and the resultant coating film was dried at a temperature of 95 °C for 10 minutes to form a charge-generating layer having a thickness of 0.15 μm.

<Hole-Transporting Layer>

The following materials were prepared.

Hole-transporting substance represented by the following formula (B-1): 5 parts (B-1)

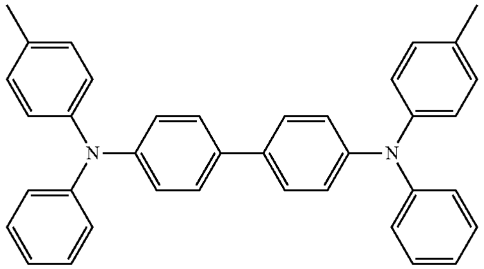

Hole-transporting substance represented by the following formula (B-2): 5 parts (B-2)

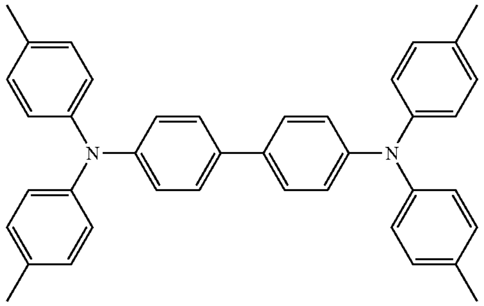

Polycarbonate resin (product name: Iupilon Z-400, manufactured by Mitsubishi Engineering-Plastics Corporation): 10 parts Those materials were dissolved in a mixed solvent of 25 parts of orthoxylene, 25 parts of methyl benzoate, and 25 parts of dimethoxymethane to prepare a coating liquid for a hole-transporting layer.

The thus prepared coating liquid for a hole-transporting layer was applied onto the above-mentioned charge-generating layer by dip coating to form a coating film, and the coating film was dried by being heated at a temperature of 120 °C for 30 minutes to form a hole-transporting layer having a thickness of 25 μm.

[Evaluation]

<Method of Preparing Sample for X-Ray Diffraction Pattern Measurement>

An electron-transporting layer was formed by the same method as that described in the above-mentioned section [Production of Electrophotographic Photosensitive Member] through use of an aluminum cylinder having wound therearound an aluminum sheet having a thickness of 50 μm as a support instead of the aluminum cylinder. After that, the aluminum sheet was peeled from the aluminum cylinder, and was fixed to the sample stage of an X-ray diffraction pattern-measuring device with a double-sided tape, followed by the measurement of its X-ray diffraction pattern under the above-mentioned conditions.

(Pattern Memory Evaluation)

For the evaluation of a pattern memory, a laser beam printer manufactured by Hewlett-Packard Company (product name: Laser Jet Enterprise M609dn) was used as an evaluation apparatus.

The evaluation of a pattern memory was performed as described below. The produced electrophotographic photosensitive member was mounted onto the above-mentioned laser beam printer manufactured by Hewlett-Packard Company. The resultant was placed under a low-temperature and low-humidity (15 °C/10% RH) environment, and an image having a print percentage of 5% was repeatedly and continuously output on 100,000 sheets. Subsequently, an image having a vertical line pattern of 3 dots and 100 spaces was repeatedly and continuously output on 20 sheets, followed by the output of three kinds of halftone images and a solid black image shown in Table 6. Based on the visibility of vertical streaks resulting from the output of the above-mentioned vertical lines on each of those output images, the degree of occurrence of the pattern memory was ranked into five categories shown in Table 6. A case in which the pattern memory is more satisfactorily suppressed is given a higher-number rank. The "three kinds of halftone images" refer to a one-dot keima (knight of Japanese chess) pattern halftone, a one-dot and one-space horizontal line halftone, and a one-dot and two-space horizontal line halftone.

TABLE 6

| | | Pattern memory rank | | | | |
|---|---|---|---|---|---|---|
| | | 5 | 4 | 3 | 2 | 1 |
| Solid black image | | Invisible | Visible | Visible | Visible | Visible |
| Halftone image | One-dot keima (knight of Japanese chess) pattern | Invisible | Invisible | Visible | Visible | Visible |
| | One-dot and one-space horizontal line | Invisible | Invisible | Invisible | Visible | Visible |
| | One-dot and two-space horizontal line | Invisible | Invisible | Invisible | Invisible | Visible |

(Ghost Evaluation)

Figure 2A:
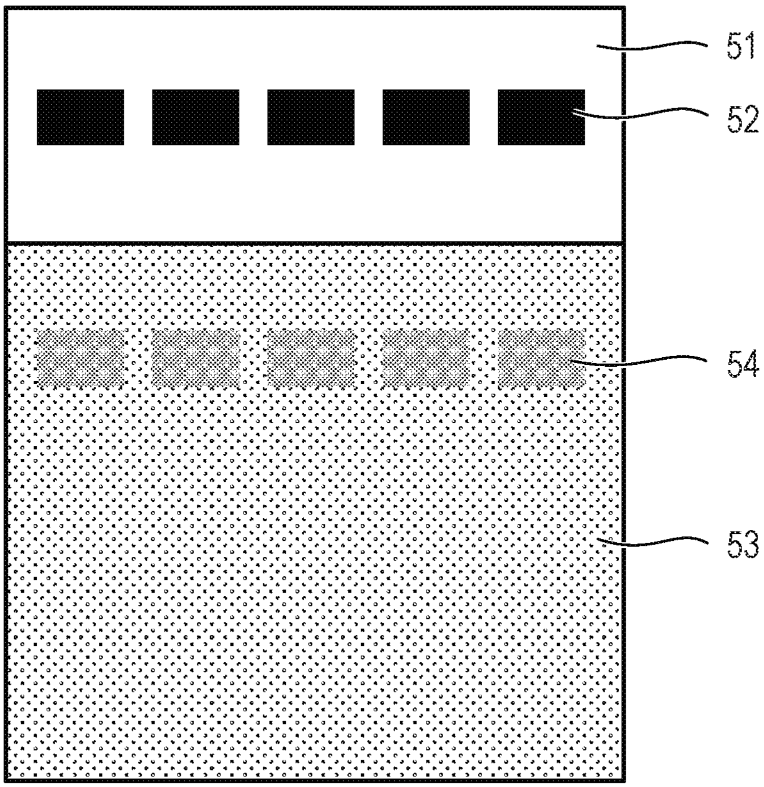
FIG. 2A and FIG. 2B are each a view for illustrating an example of an image for describing a ghost.
Figure 2B:
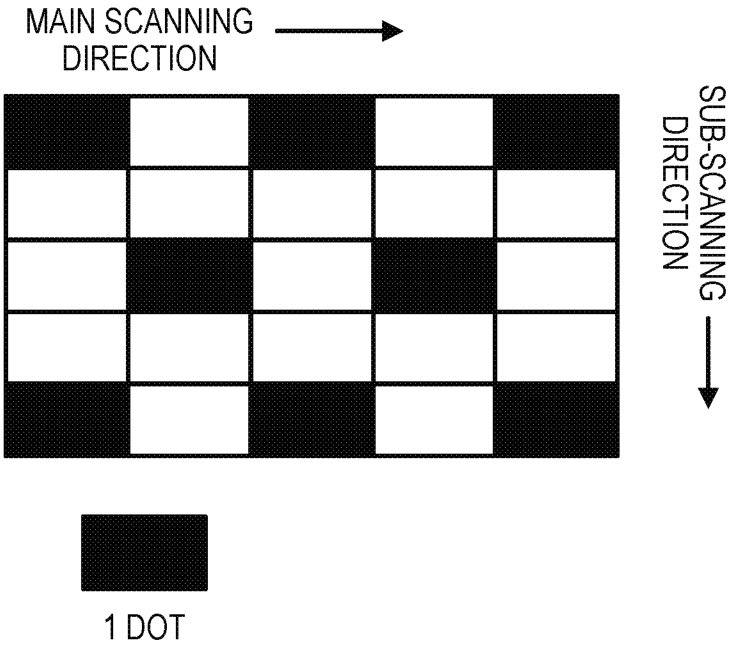

One solid white image was output on the first sheet with the same electrophotographic apparatus as that used in the above-mentioned pattern memory evaluation while its pre-exposure light was not turned on. After that, a printed image for a ghost evaluation was formed. That is, a series of such images as illustrated in FIG. 2A each including the black backgrounds (black images) 52 in the white background (white image) 51 in its front portion, followed by the halftone image 53 of a one-dot keima (knight of Japanese chess) pattern illustrated in FIG. 2B, was continuously output on 5 sheets. In FIG. 2A, the "ghost portions 54" are portions for the evaluation of the presence or absence of the appearance of ghosts resulting from the black backgrounds (black images) 52.

In a ghost evaluation, in the printed image for a ghost evaluation, a density difference between the image density of the halftone image 53 of a one-dot keima (knight of Japanese chess) pattern and the image density of each of the ghost portions 54 was measured with a spectral densitometer (product name: X-Rite 504/508, manufactured by X-Rite, Inc.). Image densities at 10 points of each of the halftone image 53 and the ghost portions 54 in the printed image for a ghost evaluation were measured, and the average of the 10 measured values was calculated. The foregoing operations were similarly performed for all of the above-mentioned 5 printed images for ghost evaluations. A density difference between the average of the image densities measured for the halftone images 53 and the average of the image densities measured for the ghost portions 54 was defined as a ghost image density difference. A smaller value of the ghost image density difference means that a higher suppressing effect on the occurrence of a ghost image is obtained. The ghost evaluation was performed by the following criteria. A rank A corresponds to a ghost image density difference of less than 0.01, a rank B corresponds to a ghost image density difference of 0.01 or more and less than 0.02, a rank C corresponds to a ghost image density difference of 0.02 or more and less than 0.03, a rank D corresponds to a ghost image density difference of 0.03 or more and less than 0.04, and a rank E corresponds to a ghost image density difference of 0.04 or more.

The results are shown in Table 7.

Examples 2 to 37

Electrophotographic photosensitive members were each produced in the same manner as in Example 1 except that the kind of the polymer used in Example 1 was changed to a polymer shown in Table 7, and the photosensitive members were similarly evaluated. The results are shown in Table 7.

Examples 38 to 40

Electrophotographic photosensitive members were produced in the same manner as in Example 27 except that the amount of the crosslinking agent in the coating liquid for an electron-transporting layer of Example 27 was changed from 2 parts to 3 parts (Example 38), 1 part (Example 39), and 0 parts (Example 40), respectively, and the photosensitive members were similarly evaluated. The results are shown in Table 7.

Example 41

An electrophotographic photosensitive member was produced as follows, and was evaluated: the support was changed to a support described below; an electroconductive layer was formed on the support as described below; and the same electron-transporting layer, charge-generating layer, and hole-transporting layer as those of Example 27 were formed on the electroconductive layer. The results are shown in Table 7.

<Support>

An aluminum cylinder having a diameter of 30 mm and a length of 260.5 mm was used as a support (cylindrical support).

<Electroconductive Layer>

Anatase type titanium oxide having a primary particle diameter of 200 nm on average was used as a base, and a titanium-niobium sulfuric acid solution containing 33.7 parts of titanium in terms of $TiO_2$ and 2.9 parts of niobium in terms of $Nb_2O_5$ was prepared. 100 Parts of the base was dispersed in pure water to provide 1,000 parts of a suspension, and the suspension was warmed to 60 °C. The titanium-niobium sulfuric acid solution and 10 mol/L sodium hydroxide were dropped into the suspension over 3 hours so that the suspension had a pH of from 2 to 3. After the total amount of the solutions had been dropped, the pH was adjusted to a value near a neutral region, and a polyacrylamide-based flocculant was added to the mixture to precipitate a solid content. The supernatant was removed, and the residue was filtered and washed, followed by drying at 110 °C. Thus, an intermediate containing 0.1 mass % of organic matter derived from the flocculant in terms of C was obtained. The intermediate was calcined in nitrogen at 750 °C for 1 hour, and was then calcined in air at 450 °C to produce titanium oxide particles. The resultant particles had a volume-average particle diameter (average primary particle diameter) of 220 nm in a particle diameter measurement method using a scanning electron microscope.

Subsequently, 50 parts of a phenol resin (monomer/oligomer of a phenol resin) (product name: PLYOPHEN J-325, manufactured by DIC Corporation, resin solid content: 60%, density after curing: 1.3 g/cm$^2$) serving as a binding material was prepared. 50 Parts of the phenol resin was dissolved in 35 parts of 1-methoxy-2-propanol serving as a solvent to provide a solution.

60 Parts of titanium oxide particles were added to the solution. The mixture was loaded into a vertical sand mill using 120 parts of glass beads having an average particle diameter of 1.0 mm as a dispersion medium, and was subjected to dispersion treatment under the conditions of a dispersion liquid temperature of 23±3 °C and a number of revolutions of 1,500 rpm (peripheral speed: 5.5 m/s) for 4 hours to provide a dispersion liquid. The glass beads were removed from the dispersion liquid with a mesh.

Subsequently, the following materials were prepared.

Silicone oil (product name: SH28 PAINT ADDITIVE, manufactured by Dow Corning Toray Co., Ltd.) serving as a leveling agent: 0.01 part Silicone resin particles (product name: KMP-590, manufactured by Shin-Etsu Chemical Co., Ltd., average particle diameter: 2 μm, density: 1.3 g/cm$^3$) serving as a surface roughness-imparting material: 8 parts Those materials were added to the dispersion liquid after the removal of the glass beads, and the mixture was stirred and filtered under pressure with PTFE filter paper (product name: PF060, manufactured by Advantec Toyo Kaisha, Ltd.) to prepare a coating liquid for an electroconductive layer.

The thus prepared coating liquid for an electroconductive layer was applied onto the above-mentioned support by dip coating to form a coating film, and the coating film was cured by being heated at 150 °C for 20 minutes. Thus, an electroconductive layer having a thickness of 25 μm was formed.

Comparative Example 1

An electrophotographic photosensitive member was produced in the same manner as in Example 1 except that in Example 1, the polymer 1 was changed to a polymer A having a repeating structural unit represented by the following formula (C-1), and the photosensitive member was evaluated. The results are shown in Table 7.

Polymer A (molecular weight: 3,469, glass transition temperature Tg: 52 °C)

(C-1)

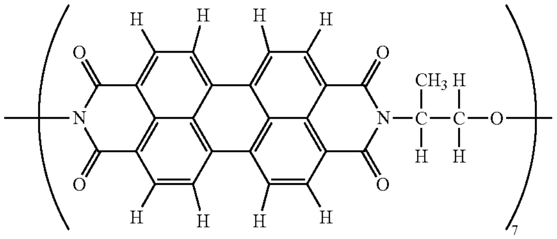

Comparative Example 2

An electrophotographic photosensitive member was produced in the same manner as in Example 1 except that in Example 1, an electron-transporting layer was formed as described below, and the photosensitive member was similarly evaluated. The results are shown in Table 7.

<Electron-Transporting Layer>

300 Parts by mass of distilled water, 500 parts by mass of methanol, and 8 parts by mass of triethylamine each serving as a dispersion medium were added to 40 parts of a copolymer B having a repeating structural unit represented by the following formula (C-2) and a repeating structural unit represented by the following formula (C-3). The mixture was subjected to dispersion treatment with a sand mill apparatus using glass beads each having a diameter of 1 mm for 2 hours to prepare a coating liquid (dispersion liquid) for an electron-transporting layer. The coating liquid for an electron-transporting layer was applied onto the support by dip coating, and was heated at 120 °C for 10 minutes so that the dispersion medium was evaporated, and the particles of the copolymer were melted or aggregated (dried). Thus, an electron-transporting layer having a thickness of 1.0 μm was formed.

Polymer B (molecular weight: 11,000, glass transition temperature Tg: 70 °C, copolymerization ratio (mol %):formula (C-2):formula (C-3)=19:1)

(C-2)

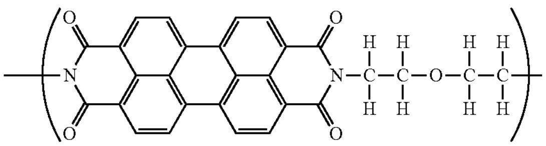

-continued (C-3)

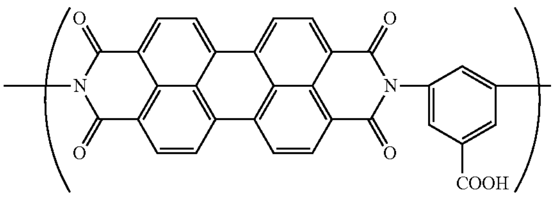

Comparative Example 3

An electrophotographic photosensitive member was produced in the same manner as in Example 1 except that in Example 1, an electron-transporting layer was formed as described below, and the photosensitive member was similarly evaluated. The results are shown in Table 7.

<Electron-Transporting Layer>

10 Parts of a polymer formed of the mixture of two kinds of materials, that is, a polymer having a repeating structural unit represented by the following formula (C-4) and a polymer having a repeating structural unit represented by the following formula (C-5) was prepared. 10 Parts of the polymer was dissolved in a mixed solvent containing 30 parts by mass of N-methyl-2-pyrrolidone and 60 parts of cyclohexanone to prepare a coating liquid for an electron-transporting layer.

The coating liquid for an electron-transporting layer was applied onto the support by dip coating, and the resultant coating film was heated at 150 °C for 30 minutes so that the solvent was evaporated, and the polymers were condensed. Thus, an electron-transporting layer, which contained a polymer C having a repeating structural unit represented by the following formula (C-6) and had a thickness of 1.0 μm, was formed.

The polymer having the repeating structural unit represented by the formula (C-4) and the polymer having the repeating structural unit represented by the formula (C-5) each had a molecular weight of 20,000. In addition, the glass transition temperature Tg of the polymer C having the repeating structural unit represented by the formula (C-6) was not observed in the range of from −50 °C to 200 °C.

(C-4)

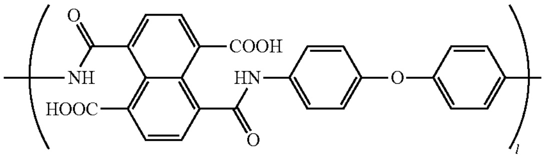

(C-5)

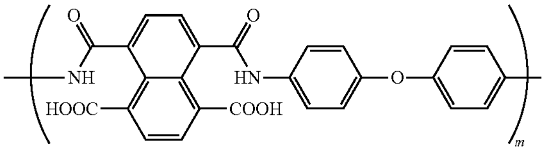

-continued (C-6)

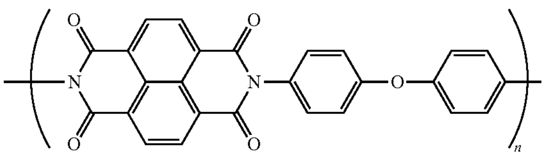

TABLE 7

| | Polymer | Peak at 2θ = 7.5° ± 2.5° in X-ray diffraction | Evaluation result: Pattern memory | Evaluation result: Ghost |
|---|---|---|---|---|
| Example 1 | Polymer 1 | Present | 5 | A |
| Example 2 | Polymer 2 | Present | 5 | A |
| Example 3 | Polymer 3 | Present | 5 | A |
| Example 4 | Polymer 4 | Present | 5 | A |
| Example 5 | Polymer 5 | Present | 5 | A |
| Example 6 | Polymer 6 | Present | 5 | A |
| Example 7 | Polymer 7 | Present | 5 | A |
| Example 8 | Polymer 8 | Present | 5 | A |
| Example 9 | Polymer 9 | Present | 5 | A |
| Example 10 | Polymer 10 | Present | 5 | A |
| Example 11 | Polymer 11 | Present | 5 | A |
| Example 12 | Polymer 12 | Present | 5 | A |
| Example 13 | Polymer 13 | Present | 5 | A |
| Example 14 | Polymer 14 | Present | 5 | B |
| Example 15 | Polymer 15 | Present | 5 | A |
| Example 16 | Polymer 16 | Present | 5 | A |
| Example 17 | Polymer 17 | Present | 5 | A |
| Example 18 | Polymer 18 | Present | 5 | A |
| Example 19 | Polymer 19 | Present | 5 | A |
| Example 20 | Polymer 20 | Present | 5 | A |
| Example 21 | Polymer 21 | Present | 5 | A |
| Example 22 | Polymer 22 | Present | 5 | A |
| Example 23 | Polymer 23 | Present | 5 | A |
| Example 24 | Polymer 24 | Present | 5 | A |
| Example 25 | Polymer 25 | Present | 5 | A |
| Example 26 | Polymer 26 | Present | 5 | A |
| Example 27 | Polymer 27 | Present | 5 | A |
| Example 28 | Polymer 28 | Present | 4 | A |
| Example 29 | Polymer 29 | Present | 4 | A |
| Example 30 | Polymer 30 | Present | 3 | B |
| Example 31 | Polymer 31 | Present | 5 | B |
| Example 32 | Polymer 32 | Present | 5 | B |
| Example 33 | Polymer 33 | Present | 5 | B |
| Example 34 | Polymer 34 | Present | 3 | A |
| Example 35 | Polymer 35 | Present | 3 | C |
| Example 36 | Polymer 36 | Present | 4 | B |
| Example 37 | Polymer 37 | Present | 4 | B |
| Example 38 | Polymer 27 | Present | 4 | A |
| Example 39 | Polymer 27 | Present | 5 | A |
| Example 40 | Polymer 27 | Present | 5 | A |
| Example 41 | Polymer 27 | Present | 5 | B |
| Comparative Example 1 | Polymer A | Absent | 5 | D |
| Comparative Example 2 | Copolymer B | Absent | 3 | E |
| Comparative Example 3 | Polymer C | Absent | 1 | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065931, filed Apr. 13, 2023, which is hereby incorporated by reference herein in its entirety.

What is claimed is:

1. An electrophotographic photosensitive member comprising in this order:

a support;

an electron-transporting layer;

a charge-generating layer; and a hole-transporting layer, wherein the electron-transporting layer comprises a polymer having a structural unit represented by the following formula (1), the following formula (2), or the following formula (3), and wherein the polymer has a glass transition temperature Tg of −10 to 50 °C:

(1)

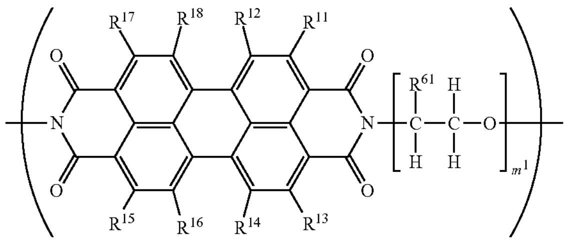

(2)

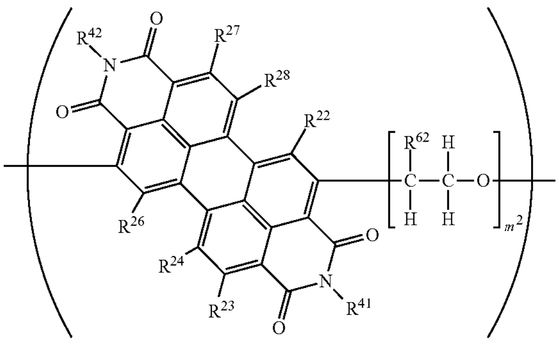

(3)

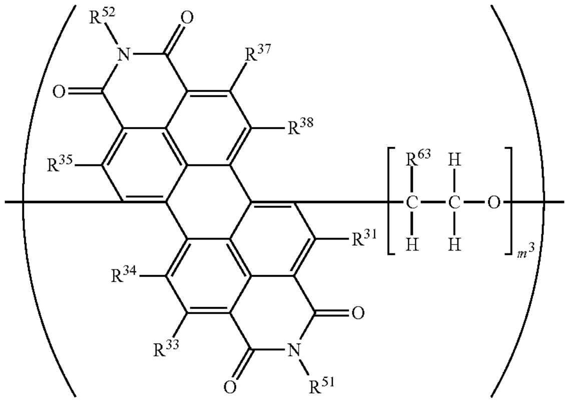

in the formula (1), $R^{11}$, $R^{12}$, $R^{13}$, $R^{14}$, $R^{15}$, $R^{16}$, $R^{17}$, and $R^{18}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{61}$ represents a hydrogen atom, or a substituted or unsubstituted alkyl group, and $m^1$ represents an integer of 2 to 16;

in the formula (2), $R^{22}$, $R^{23}$, $R^{24}$, $R^{26}$, $R^{27}$, and $R^{28}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{62}$ represents a hydrogen atom, or a substituted or unsubstituted alkyl group, $R^{41}$ and $R^{42}$ each independently represent a hydrogen atom, a substituted or unsubstituted alkyl group, or a substituted or unsubstituted aryl group, and $m^2$ represents an integer of 2 to 16; and in the formula (3), $R^{31}$, $R^{33}$, $R^{34}$, $R^{35}$, $R^{37}$, and $R^{38}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{63}$ represents a hydrogen atom, or a substituted or unsubstituted alkyl group, $R^{51}$ and $R^{52}$ each independently represent a hydrogen atom, a substituted or unsubstituted alkyl group, or a substituted or unsubstituted aryl group, and $m^3$ represents an integer of 2 to 16.

2. The electrophotographic photosensitive member according to claim 1, wherein $m^1$ in the formula (1), $m^2$ in the formula (2), and $m^3$ in the formula (3) each represent an integer of 2 to 6.

3. The electrophotographic photosensitive member according to claim 1, wherein $R^{61}$ in the formula (1), $R^{62}$ in the formula (2), and $R^{63}$ in the formula (3) each represent a methyl group.

4. The electrophotographic photosensitive member according to claim 1, wherein the polymer has a weight-average molecular weight of 30,000 or less.

5. The electrophotographic photosensitive member according to claim 1, wherein a CuKα characteristic X-ray diffraction pattern obtained for the electron-transporting layer has a peak at a position of 2θ=7.5°±2.5° where θ represents a Bragg angle.

6. A method of producing an electrophotographic photosensitive member comprising a support, an electron-transporting layer, a charge-generating layer, and a hole-transporting layer in the stated order, the method comprising a step of forming a coating film of a coating liquid for an electron-transporting layer, followed by drying and/or curing of the coating film to form the electron-transporting layer, wherein the coating liquid for an electron-transporting layer comprises a polymer having a structural unit represented by the following formula (1), the following formula (2), or the following formula (3), and wherein the polymer has a glass transition temperature Tg of −10 to 50 °C:

(1)

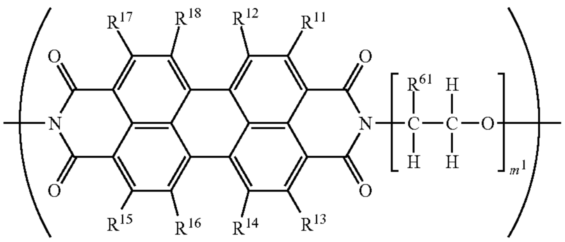

(2)

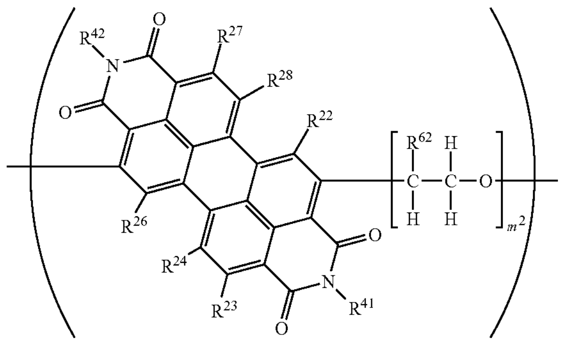

(3)

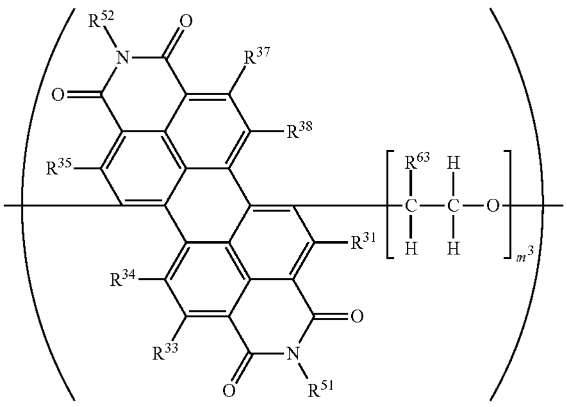

in the formula (1), $R^{11}$, $R^{12}$, $R^{13}$, $R^{14}$, $R^{15}$, $R^{16}$, $R^{17}$, and $R^{18}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{61}$ represents a hydrogen atom, or a substituted or unsubstituted alkyl group, and $m^1$ represents an integer of 2 to 16;

in the formula (2), $R^{22}$, $R^{23}$, $R^{24}$, $R^{26}$, $R^{27}$, and $R^{28}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{62}$ represents a hydrogen atom, or a substituted or unsubstituted alkyl group, $R^{41}$ and $R^{42}$ each independently represent a hydrogen atom, a substituted or unsubstituted alkyl group, or a substituted or unsubstituted aryl group, and $m^2$ represents an integer of 2 to 16; and in the formula (3), $R^{31}$, $R^{33}$, $R^{34}$, $R^{35}$, $R^{37}$, and $R^{38}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{63}$ represents a hydrogen atom, or a substituted or unsubstituted alkyl group, $R^{51}$ and $R^{52}$ each independently represent a hydrogen atom, a substituted or unsubstituted alkyl group, or a substituted or unsubstituted aryl group, and $m^3$ represents an integer of 2 to 16.

7. The method of producing an electrophotographic photosensitive member according to claim 6, wherein the coating liquid for an electron-transporting layer further comprises a crosslinking agent, and wherein the step includes curing the coating film.

8. A process cartridge comprising:

an electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus, the electrophotographic photosensitive member comprising in this order:

a support;

an electron-transporting layer;

a charge-generating layer; and a hole-transporting layer, wherein the electron-transporting layer comprises a polymer having a structural unit represented by the following formula (1), the following formula (2), or the following formula (3), and wherein the polymer has a glass transition temperature Tg of −10 to 50 °C:

(1)

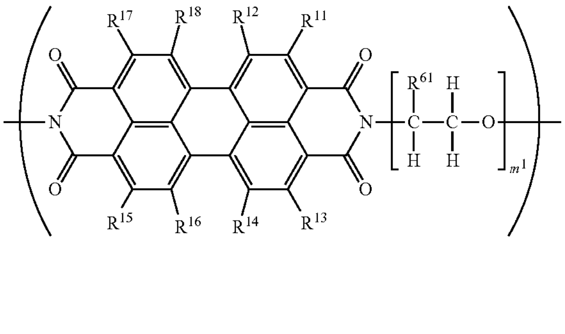

-continued (2)

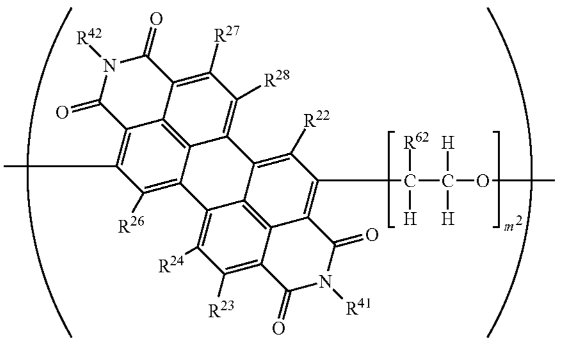

(3)

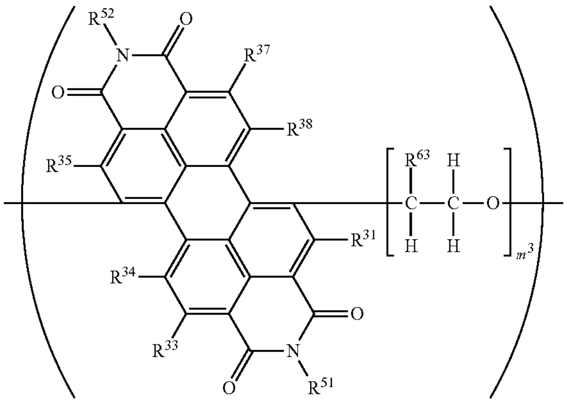

in the formula (1), $R^{11}$, $R^{12}$, $R^{13}$, $R^{14}$, $R^{15}$, $R^{16}$, $R^{17}$, and $R^{18}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{61}$ represents a hydrogen atom, or a substituted or unsubstituted alkyl group, and $m^1$ represents an integer of 2 to 16;

in the formula (2), $R^{22}$, $R^{23}$, $R^{24}$, $R^{26}$, $R^{27}$, and $R^{28}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{62}$ represents a hydrogen atom, or a substituted or unsubstituted alkyl group, $R^{41}$ and $R^{42}$ each independently represent a hydrogen atom, a substituted or unsubstituted alkyl group, or a substituted or unsubstituted aryl group, and $m^2$ represents an integer of 2 to 16; and in the formula (3), $R^{31}$, $R^{33}$, $R^{34}$, $R^{35}$, $R^{37}$, and $R^{38}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, amino group, a substituted or unsubstituted alkyl group, a substituted or unsubstituted alkynyl group, or a substituted or unsubstituted aryl group, $R^{63}$ represents a hydrogen atom, or a substituted or unsubstituted alkyl group, $R^{51}$ and $R^{52}$ each independently represent a hydrogen atom, a substituted or unsubstituted alkyl group, or a substituted or unsubstituted aryl group, and $m^3$ represents an integer of 2 to 16.

9. An electrophotographic apparatus comprising:

an electrophotographic photosensitive member;

a charging unit;

an exposing unit;

a developing unit; and a transfer unit, the electrophotographic photosensitive member comprising in this order:

a support;

an electron-transporting layer;

a charge-generating layer; and a hole-transporting layer, wherein the electron-transporting layer comprises a polymer having a structural unit represented by the following formula (1), the following formula (2), or the following formula (3), and wherein the polymer has a glass transition temperature Tg of −10 to 50 °C:

(1)

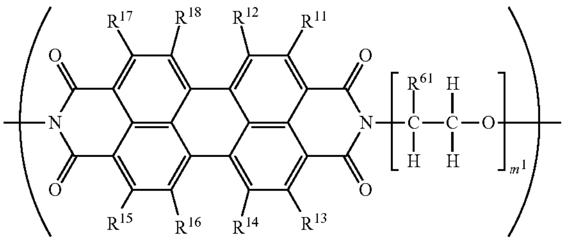

(2)

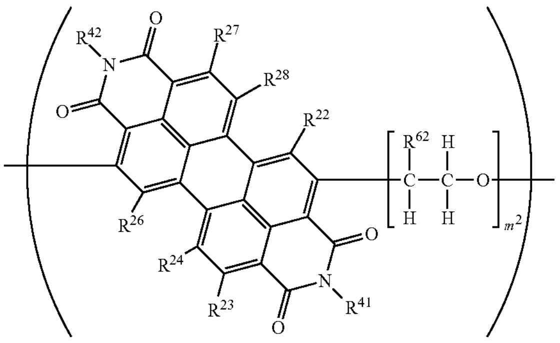

-continued (3)

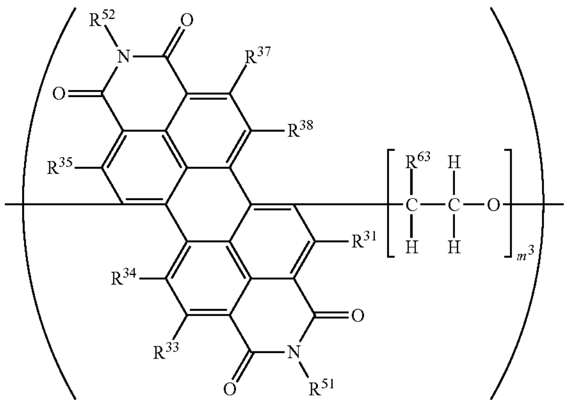

in the formula (1), $R^{11}$, $R^{12}$, $R^{13}$, $R^{14}$, $R^{15}$, $R^{16}$, $R^{17}$, and $R^{18}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{61}$ represents a hydrogen atom, or a substituted or unsubstituted alkyl group, and $m^1$ represents an integer of 2 to 16;

in the formula (2), $R^{22}$, $R^{23}$, $R^{24}$, $R^{26}$, $R^{27}$, and $R^{28}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{62}$ represents a hydrogen atom, or a substituted or unsubstituted alkyl group, $R^{41}$ and $R^{42}$ each independently represent a hydrogen atom, a substituted or unsubstituted alkyl group, or a substituted or unsubstituted aryl group, and $m^2$ represents an integer of 2 to 16; and in the formula (3), $R^{31}$, $R^{33}$, $R^{34}$, $R^{35}$, $R^{37}$, and $R^{38}$ each independently represent a hydrogen atom, a halogen atom, a nitro group, a cyano group, a trifluoromethyl group, a substituted or unsubstituted alkoxy group, a substituted or unsubstituted thiol group, a substituted or unsubstituted amino group, a substituted or unsubstituted alkyl group, a substituted or unsubstituted alkynyl group, or a substituted or unsubstituted aryl group, $R^{63}$ represents a hydrogen atom, or a substituted or unsubstituted alkyl group, $R^1$ and $R^{12}$ each independently represent a hydrogen atom, a substituted or unsubstituted alkyl group, or a substituted or unsubstituted aryl group, and $m^3$ represents an integer of 2 to 16.

* * * * *